United States Patent [19]

Kurashige et al.

[11] Patent Number: 4,668,985
[45] Date of Patent: May 26, 1987

[54] VIDEO SIGNAL PROCESSING APPARATUS

[75] Inventors: Masafumi Kurashige; Yoshiyuki Ota, both of Kanagawa, Japan

[73] Assignee: Sony Corporation, Tokyo, Japan

[21] Appl. No.: 634,782

[22] Filed: Jul. 26, 1984

[30] Foreign Application Priority Data

Jul. 29, 1983 [JP] Japan .................................. 58-139226
Jul. 29, 1983 [JP] Japan .................................. 58-139225

[51] Int. Cl.[4] ............................................. H04N 7/12
[52] U.S. Cl. ...................................... 358/134; 360/22; 381/32
[58] Field of Search ................... 358/134; 360/22, 23; 370/109, 118; 381/29, 30, 31, 32, 33, 34, 35

[56] References Cited

U.S. PATENT DOCUMENTS

| 3,975,763 | 8/1926 | Kitamura | 381/32 |
| 4,183,058 | 1/1980 | Taylor | 358/134 |
| 4,222,078 | 9/1980 | Bock | 360/23 |
| 4,458,271 | 7/1984 | Horstmann | 360/22 |
| 4,467,355 | 8/1984 | Matsuda | 358/134 |

Primary Examiner—Joseph A. Orsino, Jr.
Attorney, Agent, or Firm—Lewis H. Eslinger; Alvin Sinderbrand

[57] ABSTRACT

An apparatus for processing video signals receives an input digital video signal corresponding to a displayed image and occurring in successive samples derived at a sampling clock frequency. The input digital video signal is divided into successive groups of samples corresponding to successive intervals of time, each group being further divided into N sections of successive samples and the samples within each section corresponding to a defined area of the displayed image. The received samples are written into an addressable memory at selected write addresses and are read out from selected read addresses. The read addresses are generated so as to cause cyclically sequential read out of the N sections, with the samples being read out in the order of entry and starting from the initial samples in each of the N sections. The N sections read from the memory are supplied to respective latch circuits, the outputs of which constitute N channel signals.

4 Claims, 14 Drawing Figures

VIDEO SIGNAL PROCESSING APPARATUS

BACKGROUND OF THE INVENTION

1. Field of the Invention

This invention relates to a video signal processing apparatus according to which input video signals are divided into plural channel signals for subsequent signal processing. More particularly, it relates to such apparatus according to which high-speed data signals obtained by sampling broad-band video signals such as high resolution video signals are converted into low-speed data signals transmitted on plural channels, and the resulting low-speed data signals are subsequently processed and recombined into the original signals transmitted on a single transmission channel.

2. Description of the Prior Art

Video signals may be digitally processed in known manner for e.g. noise reduction or enhancement operations. When the standard television video signals of the NTSC system, for instance, are processed digitally, since the frequency range of the video signals is approximately 4 MHz, the sampling clock frequency of approximately 10 MHz suffices. In this case, digital signal processing may be effected with the aid of the conventional transistor-transistor logic (TTL).

With recent progress in the art of high-resolution, high-quality or high-definition video systems making use of 1,125 scanning lines, it has become necessary to digitally process these high-resolution video signals. The frequency range for these high-resolution video signals is as broad as e.g. 25 to 30 MHz so that the sampling clock frequency used for digitally processing these broadband video signals reaches about e.g. 70 to 80 MHz. In such case, it is practically impossible to make use of standard transistor-transistor logic elements for signal processing. This has led to using emitter coupled logic (ECL, sometimes known as CML) or the like high-speed elements, or to converting sampling high-speed data into low-speed signals and digitally processing them with the use of TTLs or the like.

While the high-speed element such as ECL enables the high-speed sampling data to be directly processed digitally in an advantageous manner, the high-speed element such as ECL is generally expensive and consumes much power thus causing difficulties in heat dissipation. In addition, read-only memories (ROMs) or random access memories (RAMs) frequently used for signal processing are low-speed elements and usually of the TTL interface type so that they are difficult to interface with the ECLs or the like high-speed elements.

It is also known in the art that the high-speed data signals obtained by sampling these broadband video signals such as the aforementioned high-resolution video signals are converted into low-speed data signals, which signals are then processed with the aid of conventional TTLs. In this case, the video signal processing circuit of the standard television system, such as NTSC system, may be used without any substantial modifications, while interfacing with memory circuits or the like is also facilitated.

In converting the high-speed sampling data signals, such as high-resolution video signals, into low-speed signals, sampling data groups each consisting of N input data are converted by serial-to-parallel conversion methods to N-channel or N-phase data for reducing the clock frequency to 1/N times the original clock frequency. However, since the data of a given channel are composed of the original sampling data taken at the pitch of 1 per N consecutive data, the parallel N-channel data present discontinuities in the respective channels, thereby complicating subsequent signal processing operations. Thus, in the case of the two-dimensional image processing in general, such as noise reduction or dropout compensation, the data of the vertically or horizontally adjoining pixels on the raster are used occasionally. However, since the data of the neighboring or consecutive pixels on the raster are not available in the same channel, it becomes necessary to exchange data between the channels, which complicates signal processing. In the ensuing step of recombining the processed low-speed data signals, it has been customary to carry out separate time-axis restoration within the respective channels and to effect commutation between the channels by a switch circuit for reestablishing the signal sequence on the original channel. The circuit design is complicated because of complicated timing control involved in time-axis restoration between the respective channels and changeover of the switch circuits. In addition, since data coupling to the respective channels is effected in this manner by the switch circuit, signal processing is inevitably affected by noises or data discontinuities.

SUMMARY OF THE INVENTION

It is an object of the present invention to provide an improved video signal processing apparatus free from the aforementioned drawbacks.

It is a further object of the present invention to provide a video signal processing apparatus wherein data continuities may be maintained and complexity in the signal processing avoided when the high-speed sampling data are converted into low-speed signals.

It is a further object of the present invention to provide a video signal processing apparatus wherein low-speed signal processing is made possible through dividing the high-speed sampling data of the broadband video signals into N portions for converting the high-speed data into N-channel low-speed data for which clock signal frequency equal to 1/N times the original frequency may be employed.

It is a further object of the present invention to provide a video signal processing apparatus wherein high-speed sampling data of the broadband video signals is divided and converted into N-channel low-speed data for subsequent image processing and wherein the image processing may be performed within each channel and without data exchange between different channels.

It is another object of the present invention to provide an image signal processing apparatus wherein N-channel signals divided from a single-channel broadband video signals are compressed along time axis and subsequently reconverted into the original single-channel signals and wherein adverse effects caused by switching may be eliminated by a simple circuit design and through suitably controlling writing and read-out into and out of memory circuits.

In the light of the foregoing, the present invention provides a video signal processing apparatus wherein input video signals are divided into N sections and adapted as N-channel signals, wherein N stands for an integer larger than two, and wherein the apparatus comprises write address control means for controlling write addresses in dependence upon clock signals for said video signals, memory circuit means into which said input video signals are written under control of said write address control means, read address control means adapted to perform read address control in dependence upon said clock signals and in such a manner that signals are read out from said N sections divided from a selected unit time interval of said input video signals and written into said memory means, as readout control sequentially cycles through said sections, and that signals are read out starting from the foremost signal in each of said N sections, and N latch circuits adapted for latching signals read from said memory means by N pulses having a frequency equal to 1/N times said clock signal frequency and phase-shifted from one another by an interval equal to the period of said clock signals, the outputs from these N latch circuits being taken as signals divided into N channels.

Likewise, the present invention provides a video signal processing apparatus wherein, in the process of compressing N-channel signals along time axis and recombining them into signals transmitted on a single channel, said N-channel signals being previously obtained by dividing a selected unit time interval of consecutive signals transmitted on a single channel into N sections transmitted on N channels and expanding said N sections along time axis, it comprizes a memory circuit for storing said N-channel signals, a write address control circuit adapted for controlling signal writing in such a manner that the N-channel signals are sequentially written in said memory circuits as writing control sequentially cycles through the respective channels, and a readout address control circuit for performing readout control in such a manner that the N-channel signals are read out in the order of the original signals on the single transmission channel.

DESCRIPTION OF THE PREFERRED EMBODIMENTS

Figure 1:
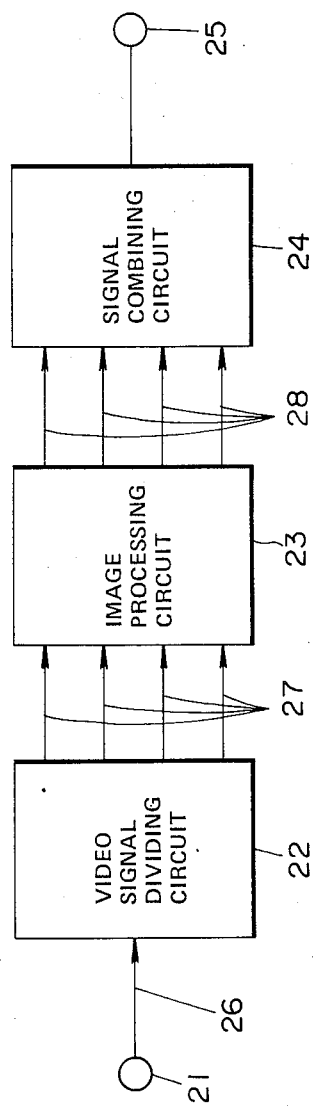
FIG. 1 is a block circuit diagram showing the basic construction of the present invention.

The basic construction of the present invention is hereafter explained by referring to FIG. 1.

High-speed data signals, i.e. digital video signals obtained by high-speed sampling of the broadband video signals, are introduced at an input terminal 21, and are supplied via a transmission line 26 to a video signal dividing circuit 22. In the circuit 22, the high-speed data signals are expanded along a time axis and divided to plural (herein four) channels so as to be supplied as low-speed data signals to a video signal processing circuit 23 via a 4-channel transmission line 27. In the processing circuit 23, the signals are subjected to noise reduction, enhancement or the like image processing steps. The resulting signals are supplied to a signal combining circuit 24 via a 4-channel transmission line 28 and combined there into unitary-channel digital image signals so as to be supplied to an output terminal 25.

The basic operation of the video signal dividing circuit forming the video signal processing circuit according to the present invention, is hereafter explained by referring to the drawings.

Figure 2:
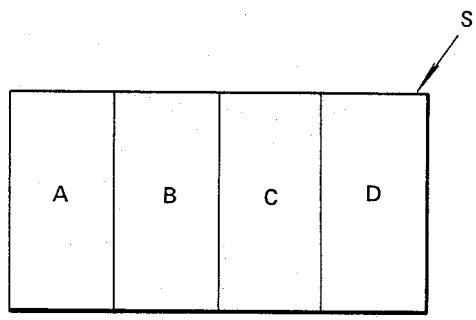
FIG. 2 is a plan view showing an image surface displayed by image signals.
Figure 3:
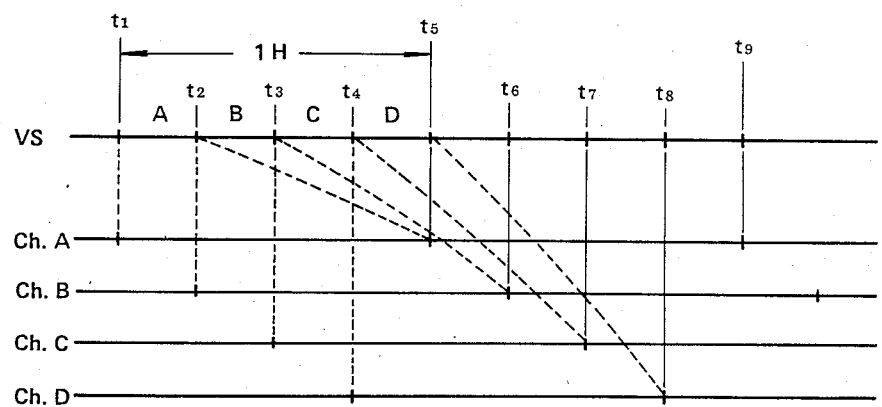
FIGS. 3 and 4 are timing charts for explaining two different examples of the video signal dividing operations.

FIG. 2 shows an image surface or raster S displayed by high resolution (i.e. high quality or high definition) video signals. This image surface S is divided vertically into four equal sections A, B, C and D whereby each horizontal line is divided into four equal segments. The video signal dividing circuit of the present invention operates for dividing the original image signals displaying the overall image surface S into 4-channel image signals corresponding to the raster sections A, B, C and D. This may for example be effected by dividing a horizontal period (1H period) of an original video signal VS into four equal parts A, B, C and D, which are then expanded along a time axis and allotted to four channels ChA, ChB, ChC and ChD (FIG. 3). Referring to the 1H-period signal since time $t_1$ until time $t_2$ of the original video signal VS shown in FIG. 3, the ¼-period signal for time $t_1$ until time $t_2$ corresponding to the block A is expanded along time axis to four times the original signal length and allotted to channel ChA. Similarly, the signal for $t_2$–$t_3$ period is expanded to the $t_2$–$t_6$ period and allotted to channel ChB, the signal for $t_3$ to $t_4$ period is expanded to the $t_3$–$t_7$ period and alotted to channel ChC and the signal for $t_4$–$t_5$ period is expanded to the $t_4$–$t_8$ period and allotted to channel ChD.

It should be noted that, when the signals are distributed in the manner shown in FIG. 3, the expanded signals are coupled to the respective channels ChA, ChB, ChC and ChD at time points $t_1$, $t_2$, $t_3$ and $t_4$ shifted by a H/4 period relative to one another. In order that the coupling points in the respective channels be coincident in timing with one another and with the horizontal sync of the original video signals, signal delay and expansion along time axis as shown for example in FIG. 4 may be employed.

The 1H-period section of the original video signal VS is divided into four equal subsections or blocks A, B, C and D, similarly to the embodiment of FIG. 3. However, in the present embodiment, the H/4-period subsection or block A is delayed by 1H and expanded to four times the original length along time axis, whereas the H/4-period subsections or blocks B, C, D are delayed by ¾ H, H/2 and H/4 with expansion along time axis. The resulting signal subsections are allotted respectively to channels ChA, ChB, ChC and ChD. Thus the four signal subsections obtained by equally dividing the 1H-period section of the video signal VS for $t_1$ to $t_5$ period, for example, are distributed in such a manner that the H/4-period subsection or block A for $t_1$–$t_2$ period is disposed in the 1H-period position for $t_5$ to $t_9$ in the channel ChA and the H/4-period subsections or blocks B, C and D for $t_2$ to $t_3$, $t_3$ to $t_4$ and $t_4$ to $t_5$ periods are similarly disposed in the 1H-period positions $t_5$ to $t_9$ in the channels ChB, ChC and ChD, respectively.

In general, in carrying out a two-dimensional video signal processing, horizontally or vertically consecutive data are frequently used, as mentioned hereinabove. According to the present invention, the signals divided from the original video signal by the dividing circuit and allotted to the respective channels correspond respectively to the raster blocks A, B, C and D in FIG. 2, so that the aforementioned image processing can be carried out easily by using the data proper to the respective separate channels.

However, since horizontally adjacent data in the boundary portions of the raster blocks A, B, C and D may be occasionally allotted to some other channels, it is preferred that the data in these boundary portions be suitably superimposed or overlap with one another when being allotted to the respective channels.

Figure 5:
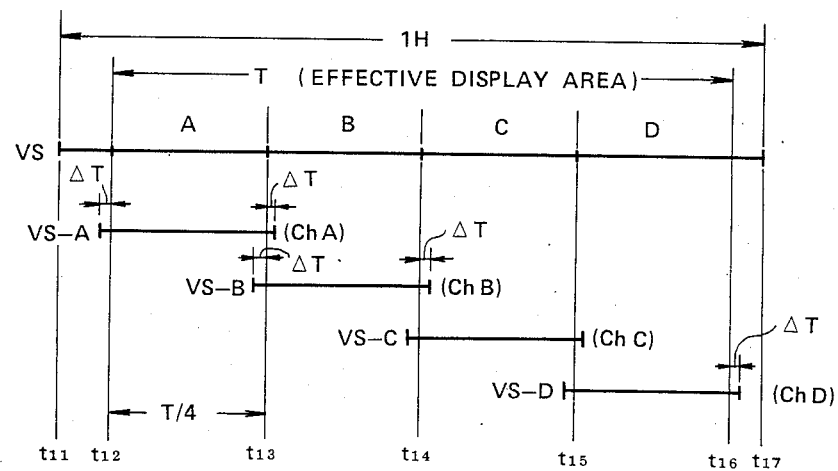
FIG. 5 is a timing chart for explaining a further example of the video signal dividing operations.

FIG. 5 shows an example of distributing the data to the respective channels ChA, ChB, ChC and ChD in such a manner that the data in the boundary portions of the respective blocks A, B, C and D in the raster S overlap with one another. In this figure, the effective display period or area of the 1H period of the original video signal VS, that is, the area actually displayed on the raster, is divided into four sections, for example, and the data corresponding to these sections plus $\Delta T$ periods added to the front and back sides of these sections are expanded along time axis and distributed to the respective channels ChA, ChB, ChC and ChD. Thus, assuming that the 1H period from time $t_{11}$ until time $t_{17}$ shown in FIG. 5 has the effective display area from time $t_2$ until time $t_{16}$, the period T from time $t_{12}$ to time $t_{16}$ is divided into four equal portions for setting time points $t_{13}$, $t_{14}$ and $t_{15}$. The data corresponding to a short time interval $\Delta T$ before time $t_{12}$ and a short time interval $\Delta T$ after time $t_{13}$ are then added to the video signal portion $t_{12}$–$t_{13}$ corresponding to the raster block A of the video signal VS and the resulting signal VS-A corresponding to the time interval $T/4 + 2\Delta T$ is expanded to four times the original signal interval along time axis and allotted to channel ChA. Similarly, the data corresponding to $\Delta T$ before and after relevant subsections are added to the signal subsections $t_{13}$–$t_{14}$, $t_{14}$–$t_{15}$ and $t_{15}$–$t_{16}$ corresponding respectively to the raster blocks B, C and D. The resulting signals VS-B, VS-C and VS-D are expanded along time axis and distributed to the respective channels ChB, ChC and ChD. Assuming that $T/4 + 2\Delta T$ is equal to or less than H/4 ($T/4 + 2\Delta T \leq H/4$), each of the signals VS-A to VS-D expanded to four times is included within a 1H-period so that no signal portions are dropped when the original video signal is divided and allotted to the respective channels.

Figure 4:
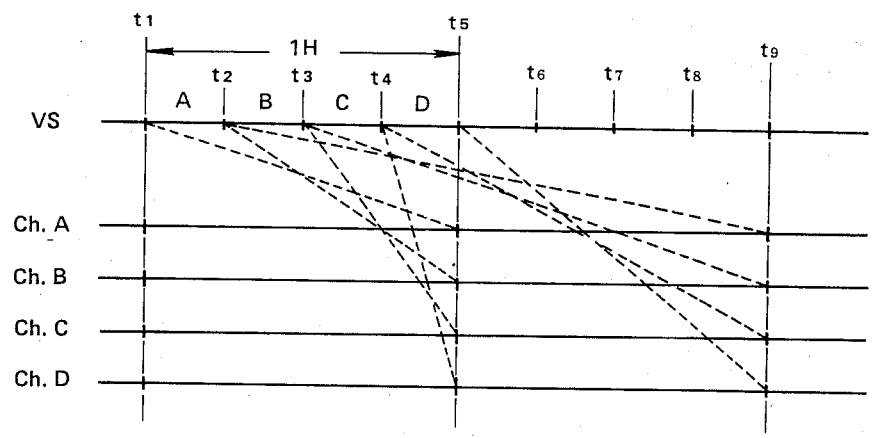

It should be noted that these partial signals VS-A to VS-D expanded along time axis may be introduced into the next 1H periods of the respective channels ChA to ChD, as explained with reference to FIG. 4.

Figure 6:
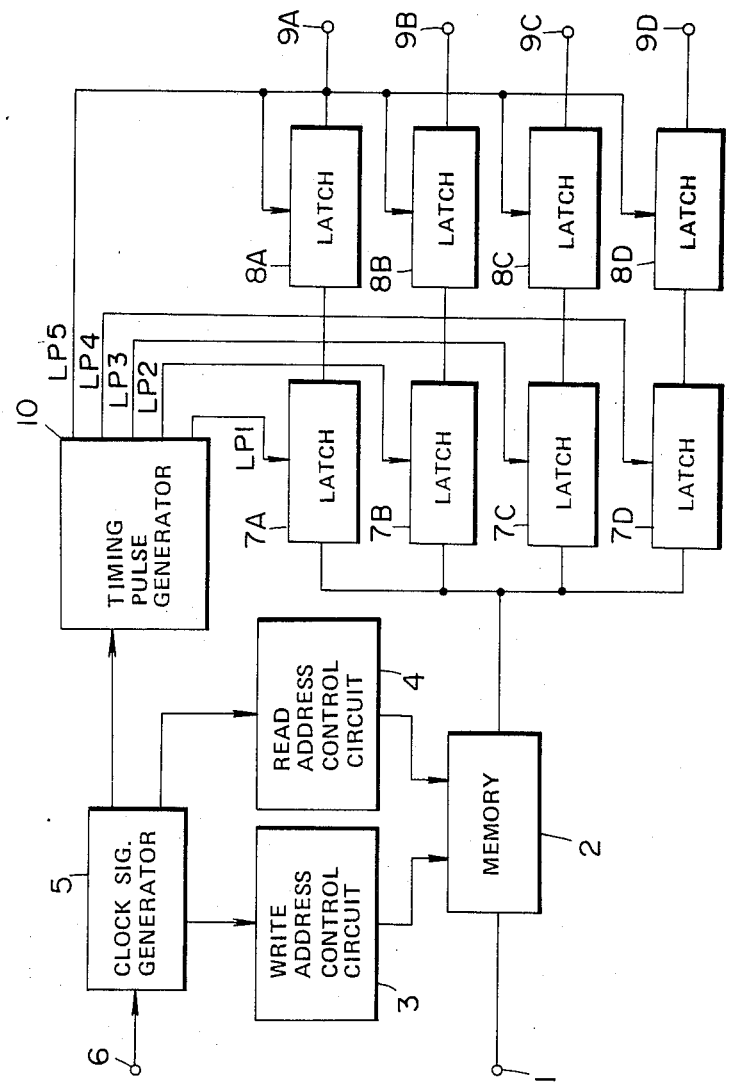
FIG. 6 is a block circuit diagram showing an example of the video signal dividing circuit according to a preferred embodiment of the present invention.

An example of the video signal dividing circuit according to the present invention is hereafter explained by referring to FIG. 6.

In this figure, digital video signals with a sampling clock frequency of e.g. 80 MHz are introduced to an input terminal 1. These input signals are obtained by digital conversion of the broadband video signals having a frequency range reaching as high as nearly 30 MHz, such as the aforementioned high-resolution video signals. These input digital video signals are supplied to a memory circuit 2 consisting e.g. of a random access memory (RAM) having a storage capacity of at least two horizontal periods (2H period). The write and read functions of the memory 2 are controlled by a write address control circuit 3 and a read address control circuit 4, respectively. Write clock and read clock signals are supplied from a clock signal generator 5 to these address control circuits 3, 4, respectively. Sampling clock signals (about 80 MHz) for the input digital video signals are supplied to the clock signal generator 5 via input terminal 6. Based on these sampling clock signals, the generator 5 outputs the aforementioned read and write clock signals with the same frequency as the clock signals.

The digital video signals are read from the memory circuit 2 and supplied to a plurality of, herein four, latch circuits 7A, 7B, 7C and 7D equal to the number of the channels into which the divided video signals are allotted as mentioned hereinabove. The outputs from these four latch circuits 7A, 7B, 7C and 7D are taken at output terminals 9A, 9B, 9C and 9D, respectively, via latch circuits 8A, 8B, 8C and 8D, respectively. The latch circuits 7A to 7D and 8A to 8D are driven by latch pulses LP1 to LP5 from a latch timing pulse generator 10 in such a manner that input signals are asynchronously latched or stored in the latch circuits 7A to 7D by latch pulses LP1 to LP4 phase-shifted relative to one another, while input signals are synchronously latched or stored in the latch circuits 8A to 8D by a unitary or in-phase latch pulse LP5.

The write and read operations into and out of the memory circuit 2 may be controlled by the control circuits 3, 4 in such a manner that each 1H section of the high-speed digital video signals introduced at the input terminal 1 is divided into four equal subsections, and the data of the respective subsections are read out sequentially starting from the timely foremost data. Thus, when the data written in a given 1H period (e.g. in a $t_1$–$t_5$ period) of the original video signal VS are read out in the next 1H period (e.g. in the $t_5$ to $t_9$ period) while being expanded along time axis, and are allotted to the respective channels, as shown in FIG. 4, the memory circuit 2 may be constructed by two line memories 2a, 2b, as shown in FIG. 7, these line memories being commutated by changeover switches 12, 13 so that one of the line memories may be used for readout when the other line memory is used for writing and vice versa.

Figure 7:
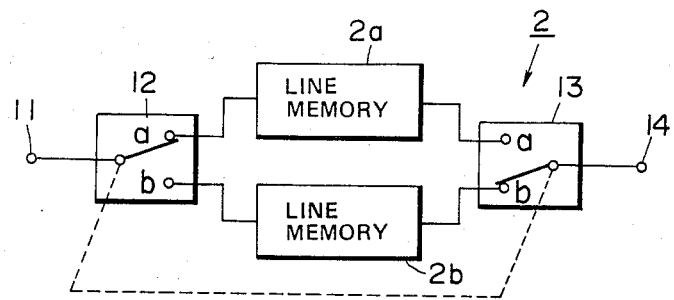
FIG. 7 is a block circuit diagram showing a memory circuit shown in FIG. 6.

Thus, the digital video signal data is supplied from the input terminal 1 shown in FIG. 6 to an input terminal 11 shown in FIG. 7 and the data from input terminal 11 are commutated by changeover switch 12 so as to be supplied to one of the line memories 2a, 2b to be written there. When one of the line memories 2a, 2b is in the write state, the other is in the readout state, so that the read-out data are taken at an output terminal 14 via changeover switch 13 so as to be supplied to the latch circuits 7A, 7B, 7C and 7D shown in FIG. 6. It should be noted that commutation between terminals a and b of the changeover switches 12, 13 is caused at intervals of 1H periods so that an electric connection through a closed one of the terminals of one switch is interrupted at the other switch through closure of the complementary terminal at the latter switch. For example, in the state shown in FIG. 7, the switch 12 is set to the terminal a while the switch 13 is set to the terminal b which is complementary to the terminal a of the switch 12.

Figure 8:
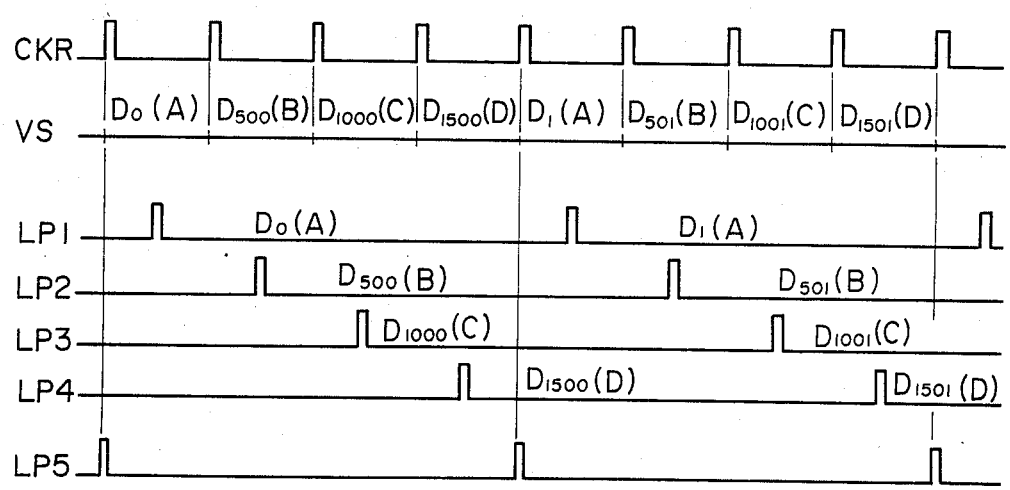
FIG. 8 is a timing chart for explaining the operation of the latch circuits shown in FIG. 6.
Figure 9:
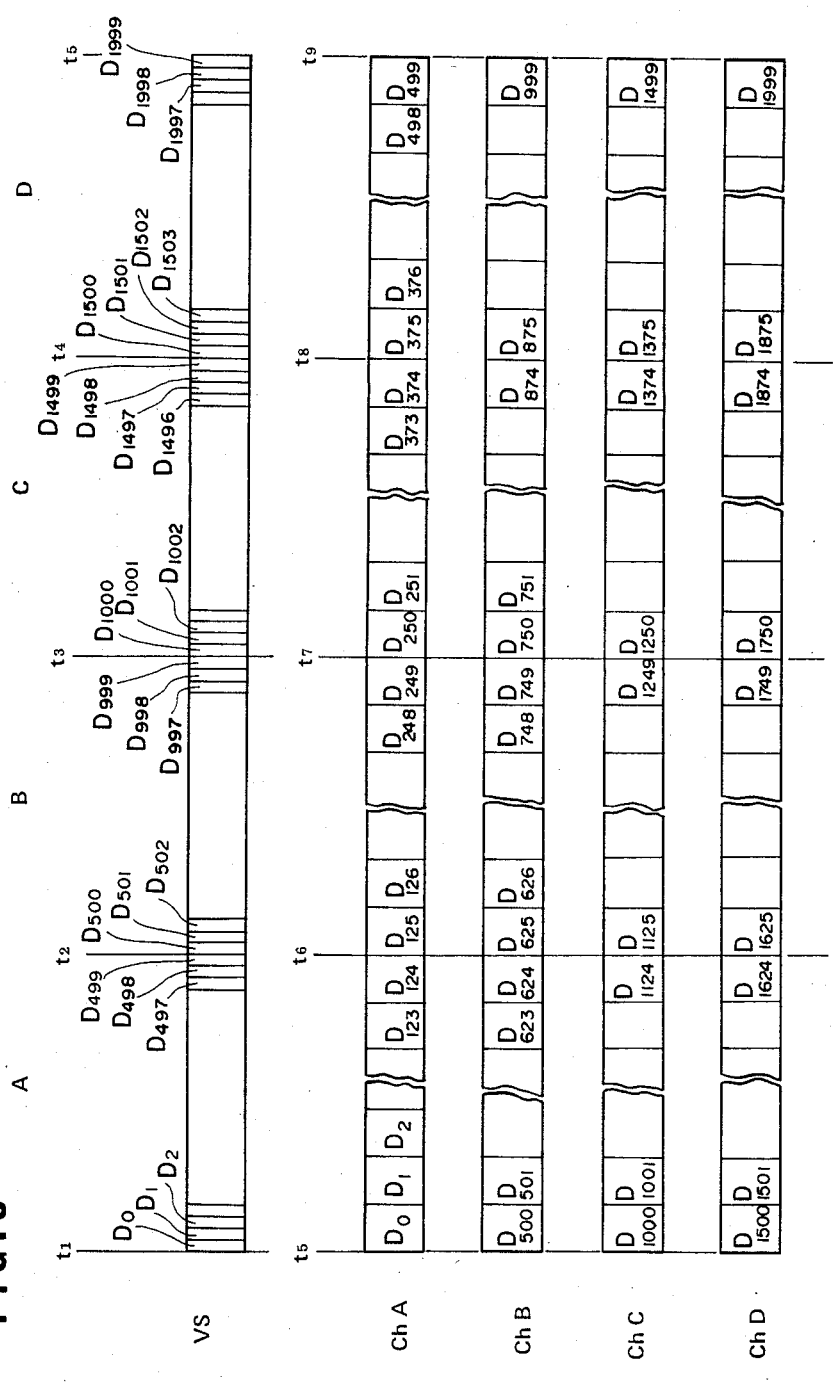
FIG. 9 is a timing chart for explaining the video signal dividing operation shown in FIG. 4.

It is only necessary that data corresponding to the blocks A, B, C and D written during the preceding 1H period are sequentially and cyclically supplied to an output terminal 14 in such a manner that signal readout within any one block is started from the occasionally foremost data. Thus, assuming that the 1H-data since time $t_1$ until time $t_5$ of the video signal VS shown in FIG. 4 are written sequentially in addresses 0 to 1999 of the 2000-word line memory, the data corresponding to the blocks A, B, C and D are written in addresses 0–499, 500–999, 1000–1499 and 1500–1999 of the line memory. In the next 1H period (time period $t_5$ to $t_9$), address control is so made that the addresses be read out in the order of 0, 500, 1000, 1500, 1, 501, 1001, 1501—so that the respective blocks are scanned cyclically and the data within each block are read out starting from the foremost address and in the order of entry in the memory. The readout clock CKR has a frequency equal to the sampling clock frequency of the original input digital video signal (e.g. about 80 MHz). When the data stored in the line memory address X (X=0, 1, 2, - - -, 1999) is expressed as Dx and the data of a block Y (Y=A, B, C or D) is expressed as Dx(y), data $D_0(A)$, $D_{500}(B)$, $D_{1000}(C)$, $D_{1500}(D)$, - - - are read out sequentially with each read-out clock CKR, as shown in FIG. 8. When one selects the latch pulses LP1, LP2, LP3, LP4 supplied respectively to the latch circuits 7A, 7B, 7C, 7D of FIG. 6 so as to have a frequency one-fourth times that of clock CKR (i.e. a period four times that of clock CKR) and a phase shift equal to one period of the clock CKR from one latch pulse to another, the latch circuit 7A sequentially will store or latch the data belonging solely to, for example, the block A. Similarly, the latch circuits 7B, 7C and 7D will store or latch the data belonging to, for example, the blocks B, C and D, respectively. In addition, latch pulse LP5 with a frequency one-fourth times the frequency of the clock CKR is concurrently supplied to the latch circuits 8A, 8B, 8C and 8D for setting the signals of the respective channels in phase with one another. Thus, as shown in FIG. 9, the data with a frequency equal to one fourth times the sampling clock frequency of the original input digital video signals (about 20 MHz) and corresponding respectively to the raster blocks A, B, C and D of FIG. 1 are taken at output terminals 9A, 9B, 9C and 9D of the latch circuits 8A, 8B, 8C and 8D as data signals for the channels ChA, ChB, ChC and ChD, respectively.

In the foregoing description, address control is so made that the write addresses are simply incremented from 0 to 1999, while the read addresses are sequentially and cyclically designated from the respective blocks in the order of 0, 500, 1000, 1500, 501, 1001, 1501, - - - . However, address control may be effected in such a manner that the input data are distributed in the respective blocks at the time they are written into the line memory. For example, when the 2000 sampling data corresponding to one horizontal scanning line of the input digital video signals are introduced sequentially to the memory circuit, address control may be so effected that the write addresses are designated in the order of 0, 4, 8, - - - , 1996, 1, 5, 9, - - - , 1997, 2, 6, 10, - - - , 1998, 3, 7, 11, - - - , 1999, while the read addresses are simply incremented from 0 to 1999. In this manner, the output data belonging to the blocks A, B, C and D will appear cyclically in the order of $D_0(A)$, $D_1(B)$, $D_2(C)$, $D_3(D)$, $D_4(A)$, $D_5(B)$, $D_6(C)$, $D_7(D)$, - - - and data signals of the respective channels ChA, ChB, ChC and ChD are supplied through latch circuits 7A to 7D and 8A to 8D.

An example of address control in which signal data are distributed to the respective channels ChA, ChB, ChC and ChD with overlapping of the boundary parts of the raster blocks A, B, C and D, as described with reference to FIG. 5, is hereafter explained.

Figure 10:
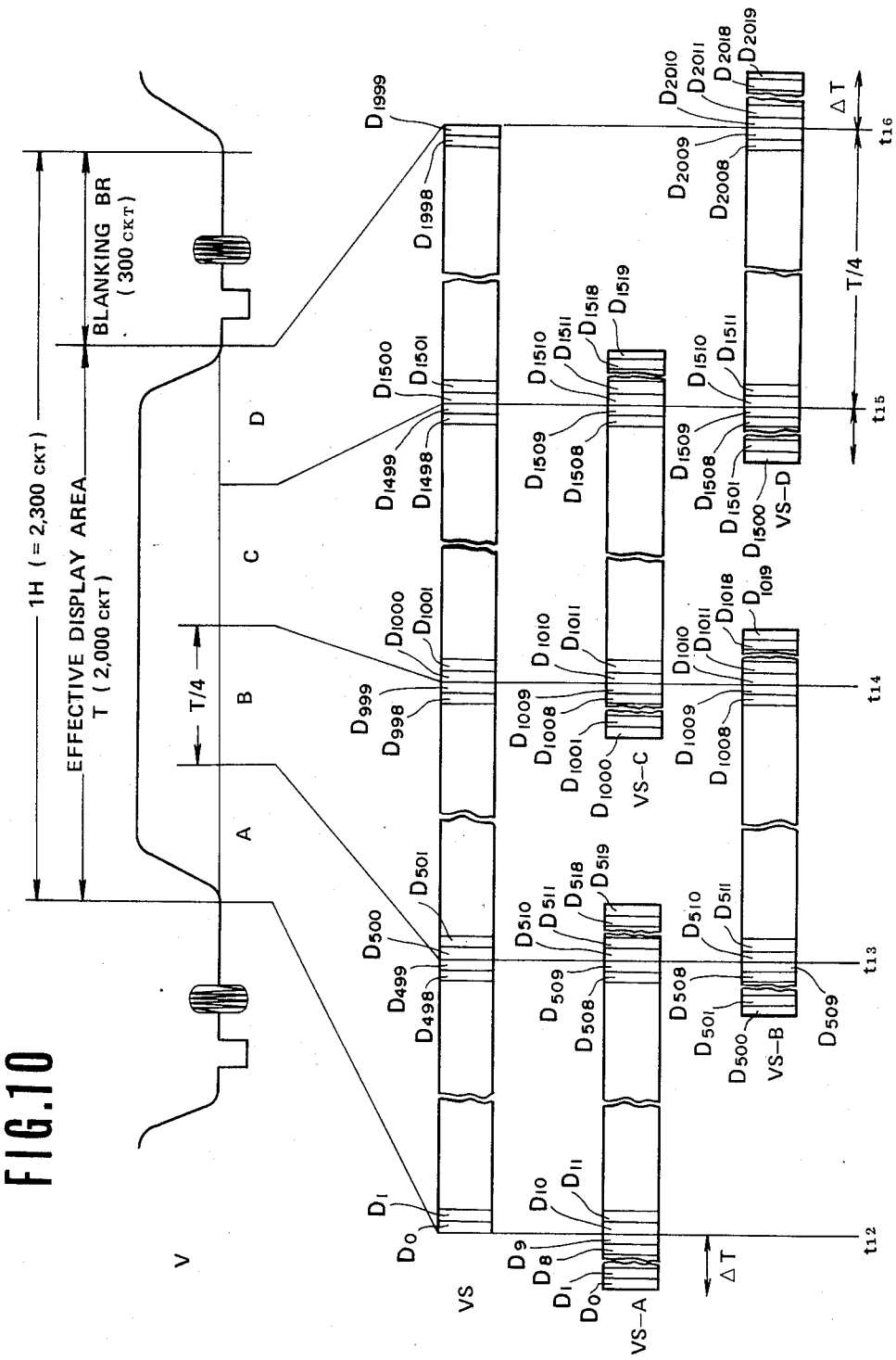
FIG. 10 is a timing chart for explaining the video signal dividing operation shown in FIG. 5.

Supposing that one data is written and read out with one clock CKT, the effective display area T is formed of 2000 data and hence 2000 clocks (CKT) long. Supposing that the blanking region BR is comprised of 300 clocks, the 1H period is 2300 clocks long. The digital video signals for 1H period are shown in FIG. 10 with the corresponding video signal V in the analog form. Assuming that 10 data are comprised in the overlapping portions, that is, the front and back $\Delta T$ periods, the data $T+2\Delta T$ long are sequentially written in the addresses 0 to 2019 of a 2020-word line memory. At this time, 500 data in each of the raster blocks A, B, C and D on a horizontal scanning line (FIG. 2) are written in the addresses 10 to 509, 510 to 1009, 1010 to 1509 and 1510 to 2009, respectively, of the line memory. While the write addresses are simply incremented from 0 to 2019, an address 0 occurs $\Delta T$ before time $t_{12}$ and an address 2019 occurs $\Delta T$ after time $t_{16}$ in FIG. 10. During readout, address designation is in the order of 0, 500, 1000, 1500, 1, 501, 1001, 1501, - - -. 520 words are read per each channel during the 1H period so that readout addressed reach - - - , 519, 1019, 1519 and 2019 just before the 1H period comes to an end. With a channel to which are allotted a read-out data $D_X(Y)$ is expressed as Z, the data is expressed as $D_X(Y\text{-}Z)$. The data are read out in the order of $D_0(\Delta\text{-}A)$, $D_{500}(A\text{-}B)$, $D_{1000}(B\text{-}C)$, $D_{1500}(C\text{-}D)$, - - - , $D_{519}(B\text{-}A)$, $D_{1019}(C\text{-}B)$, $D_{1519}(D\text{-}C)$ and $D_{2019}(\Delta\text{-}D)$. In the above, the data with a symbol $\Delta$ for the relevant block Y in a given data $D_X(Y\text{-}Z)$ represent the data that occur within an interval of $\Delta T$ before and after the effective display area shown in FIG. 10. Among the readout data, the relevant block Y and the relevant channel Z are in register with each other with the data $D_{10}(A\text{-}A)$, $D_{510}(B\text{-}B)$, $D_{1010}(C\text{-}C)$, $D_{1510}(D\text{-}D)$, - - - , $D_{509}(A\text{-}A)$, $D_{1009}(B\text{-}B)$, $D_{1509}(C\text{-}C)$ and $D_{2009}(D\text{-}D)$.

The data read out in this manner can be taken at each channel with the aid of latch circuits 7A to 7D and 8A to 8D, as mentioned hereinabove.

Figure 11:
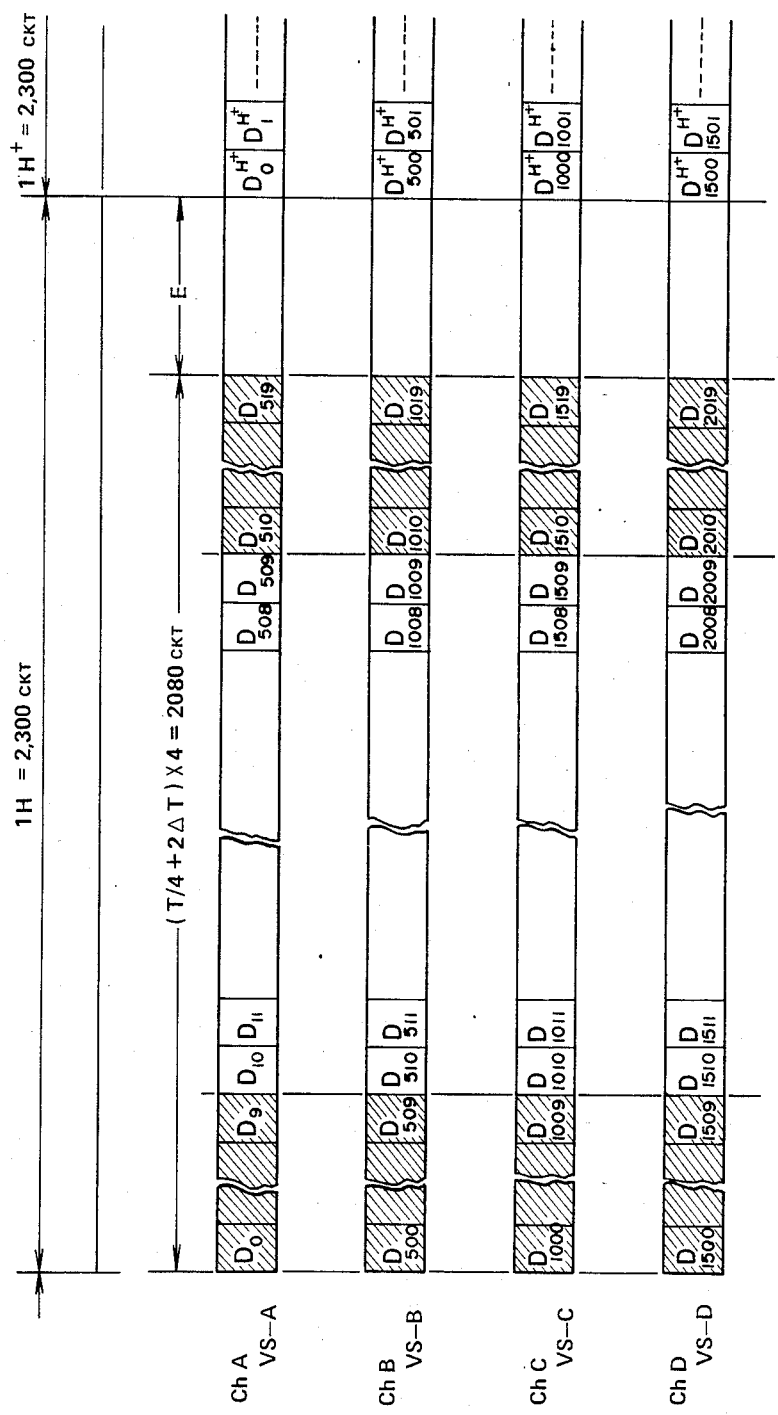
FIG. 11 is a timing chart showing output signals from respective latch circuits for the 4-channel signals divided by the operation shown in FIG. 10.

In this manner, outputs from ChA to ChD appear at output terminals 9A to 9D of the latch circuits 8A to 8D, as shown in FIG. 11. The signals of each channel are composed of 520 data, that is, 500 data for T/4 and 10 overlapping data at the front and back sides of the 500 data. Since these data are expanded along time axis to four times their original length, the total length is $(T/4+2\Delta T)\times 4=(500+20)\times 4=2080$ CKT. Therefore, these data can be processed without dropping within an interval of 1H=2300 CKT. For a domain E, void data are read out from the memory circuit 6. As an alternative measure, the read-out operation of the memory circuit may be terminated.

The outputs from the respective channels are supplied to a video signal processing circuit 23 where they are subjected separately to image processing operations such as noise reduction or enhancement within each channel.

Figure 12:
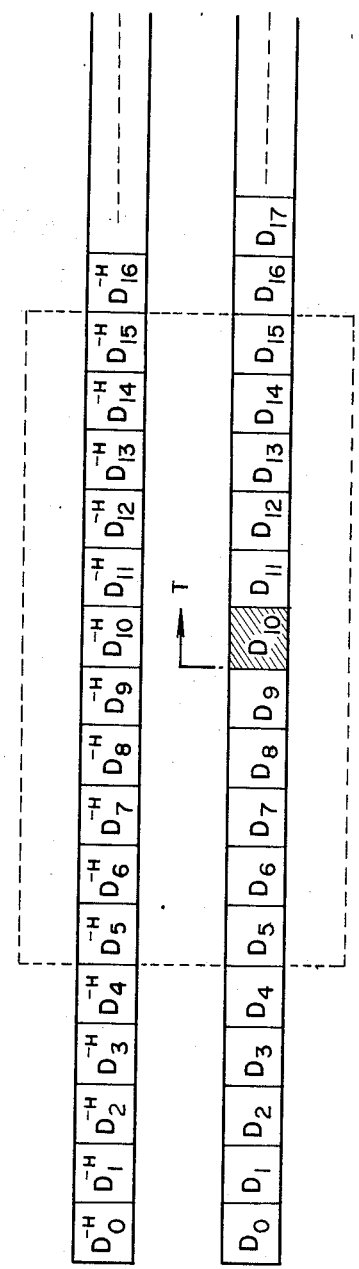
FIG. 12 shows data strings necessary for image processing.

In carrying out these various image processing operations, plural data are generally required for obtaining a single data. It is supposed for instance that five data signals each before and after a given data and corresponding data signals for the preceding 1H period are required. In this case, for processing the foremost data $D_{10}$ of the effective display area T (shown by hatching in FIG. 12), 22 data signals are required, that is, five data signals each before and after data signal $D_{10}$ ($D_5$ to $D_{15}$) and five data signals each before and after data signal $D_{10}{}^{-H}$, that is, the data signals that occurred 1H before data $D_{10}$($D_5{}^{-H}$ to $D_{15}{}^{-H}$). These 22 data are shown within a dotted-line rectangle in FIG. 12. It is also required that, among these data signals, the data signals $D_5$ and $D_5{}^{-H}$ be subjected to regular corrective operations, for which data $D_0$ to $D_4$ and $D_0{}^{-H}$ to $D_4{}^{-H}$ are additionally required. In this manner, the aforementioned value for $\Delta T$ is determined.

Figure 13:
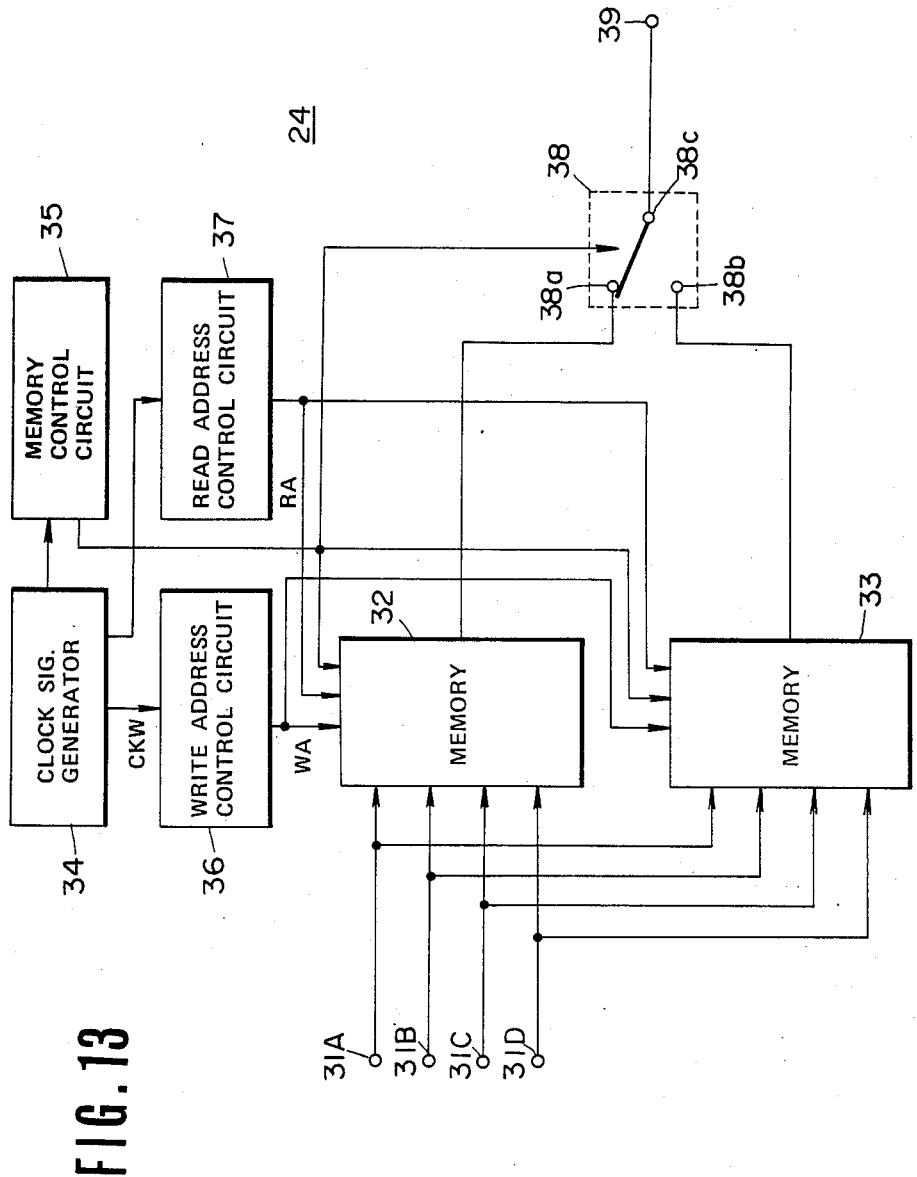
FIG. 13 is a block circuit diagram showing an example of the signal combining circuit according to a preferred embodiment of the present invention.

The signal combining circuit 24 is explained by referring to FIG. 13. The signals for channels ChA to ChD are outputted from the processing circuit 23 after signal processing and are supplied to memory circuits 32, 33 through input terminals 31A to 31D. Write addresses into memory circuits 32, 33 are controlled by a write address control circuit 36 adapted for producing write addresses based on clock signals supplied from a clock signal generator 34. In the similar manner, read addresses from the memory circuits 32, 33 are controlled by a read address control circuit 37 adapted for producing read addresses based on the aforementioned clock signals. In addition, data writing and read-out into and out of the memory circuits 32, 33 are controlled to occur alternately by the operation of a memory control circuit 35. The signal from this memory control circuit 35 also causes a switch circuit 38 to be commutated in timed relation with read-out operations of the memory circuits 32, 33 so that video signals having undergone signal processing, compression along time axis and combination on an original unitary transmission channel are supplied at an output terminal 39.

Figure 14:
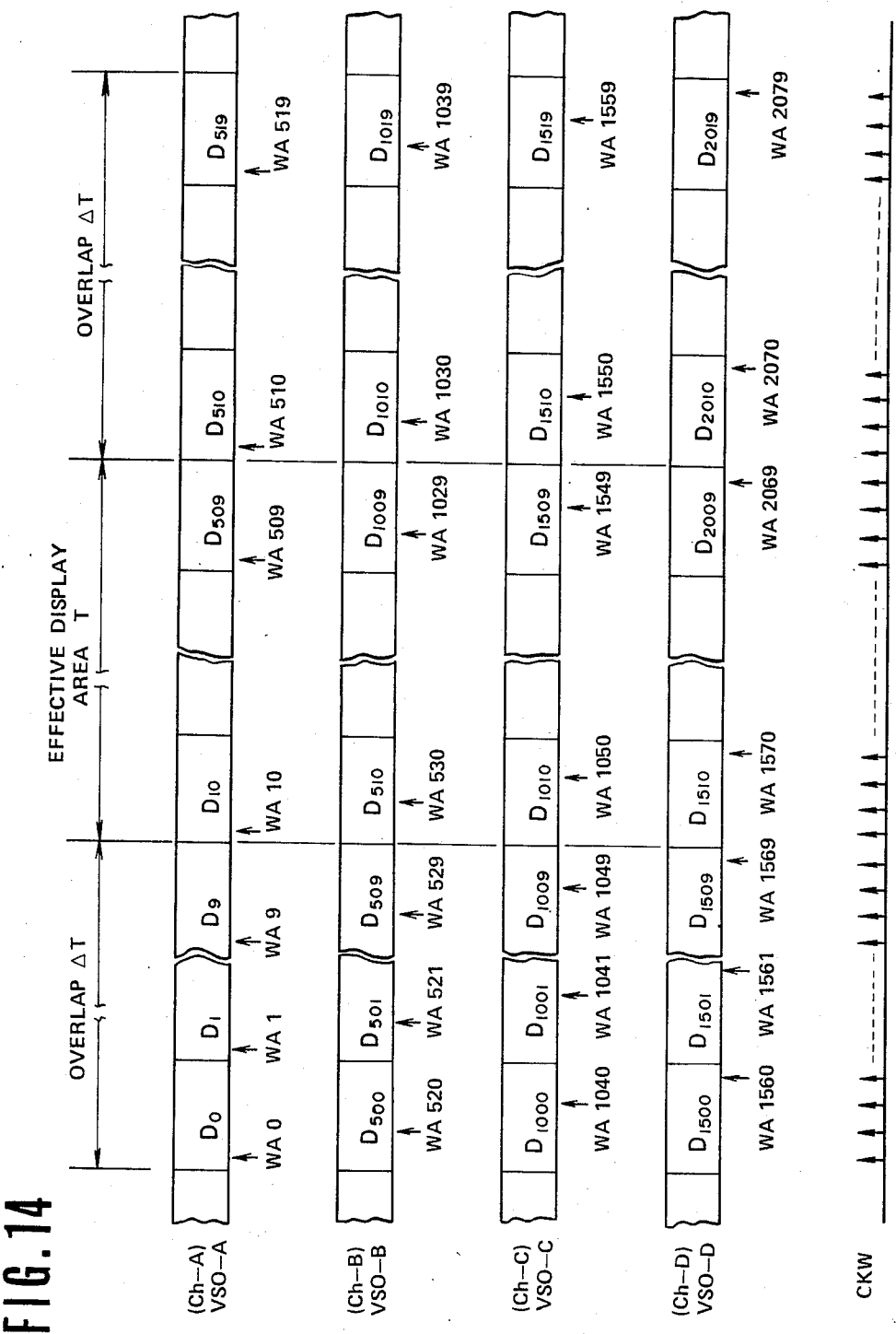
FIG. 14 is a timing chart for explaining the address control operation of the memory circuit shown in FIG. 13.

An address control operation for memory circuits 32, 33 is explained by referring to FIG. 14. The memory circuits 32, 33 are controlled by the memory control circuit 35 so as to be alternately set to a write state or read-out state at intervals of a 1H period. When the memory circuit 32 is in a read-out state in a given 1H interval, movable terminal 38a of the switch circuit 38 is connected to its fixed terminal 38c. In the next 1H period, a movable terminal 38b is connected to the fixed terminal 38c for consecutively reading the data for the 1H period. As shown, write clock pulses CKW are produced by the clock signal generator 34 for data VSO-A to VSO-D for the respective channels, which data have been expanded along time axis to four times the original data length.

Based on these clock pulses, write address signals WA are produced by the write address control circuit 36. The in-phase channel data $D_0$, $D_{500}$, $D_{1000}$ and $D_{1500}$ appearing at the input terminals 31A to 31D are written into addresses WA0, WA520, WA1040 and WA1560 in the memory circuit by address signals WA generated at each CKW. The channel data $D_1$, $D_{501}$, $D_{1001}$ and $D_{1501}$ appearing next are written in addresses WA1, WA521, WA1041 and WA1561, respectively. In this manner, addresses WA0 to WA519 are allotted to $D_0$ to $D_{519}$ of the data VSO-A in channel ChA, addresses WA520 to WA1039 are allotted to $D_{500}$ to $D_{1019}$ of the data VSO-B in channel ChB, addresses WA1040 to WA1559 are allotted to $D_{1000}$ to $D_{1519}$ of the data VSO-C in channel ChC and addresses WA1560 to WA2079 are allotted to $D_{1500}$ to $D_{2019}$ of the data VSO-D in channel ChD so that the totality of the data for the effective display area T and the overlap area $\Delta T$ are written in the memory circuits 32, 33.

Then, with the aid of a read-out address signal RA from the readout address control circuit 37, read-out control is made in such a manner that the data contained in addresses WA10, WA11, - - - , WA508, WA509, WA530, WA531, - - - WA1028, WA1029, WA1050, WA1051, - - - WA1548, WA1549, WA1570, WA1571, - - - WA2068, WA2069 are read out in the order. Thus the data included in the effective display area T are consecutively read from the respective channels, and to the exclusion of the overlapping data $\Delta T$. It should be noted that, with the aid of the write address signal WA applied to memory circuits 32, 33, write addresses WA0 to WA499 are allotted to $D_{10}$ to $D_{599}$ of the data VSO-A, write addresses WA500 to WA999 are allotted to $D_{510}$ to $D_{1009}$ of the data VSO-B, write addresses WA1000 to WA1499 are allotted to $D_{1010}$ to $D_{1509}$ of the data VSO-C and write addresses WA1500 to WA1999 are allotted to $D_{1510}$ to $D_{2009}$ of the data VSO-D so that solely the data included in the effective display area can be read out continuously even in instances where memory address values WA0 to WA1999 are allotted with the aid of the readout address signal RA during the read-out operation.

According to the above described embodiment of the present invention, high-speed data of e.g. 800 MHz in terms of the clock frequency may be converted, with the use of a small memory capacity of the order of two horizontal scanning lines (2H), into e.g. 4-channel low-speed data of e.g. 20 MHz in terms of the clock frequency. Thus, image processing can be performed with the use of ordinary transistor-transistor logics and thus without resorting to high-speed elements such as emitter coupled logics. Since the data divided into these channels correspond to raster blocks obtained by dividing the original raster in equal length parts along the horizontal scanning lines, two-dimensional image processing may be generally performed by solely using the data of the relevant channels. In this case, signal discontinuities at the junction points in the direction of the horizontal scanning lines or at boundary portions of the raster blocks may be eliminated in such a manner that the data in the neighborhood of the boundary portions are included in the relevant channels as overlapped data, whereby image processing resorting to the totality of the horizontally consecutive data may be effected by using the data of the respective relevant channels. In addition, the clock signals as well as the data (foremost data) of the respective channels can be adjusted to an in-phase relation to one another, in such a manner that the data divided into the separate channels can be controlled generally with the use of unitary control signals, so that signal processing may be facilitated.

The foregoing embodiments are given only by way of illustration and are not intended for limiting the present invention. Although the input video signal is allotted to four channels in the above embodiments, it can be divided generally into N channels, where N stands for an integer larger than 2. In addition, although the 1H period is divided into N portions in the above embodiment, any other time interval may be divided into N channels. The signals thus divided into N channels may be otherwise processed or supplied to a signal recording system or a signal transmission system, instead of being used in two-dimensional image processing.

What is claimed is:

1. Apparatus for processing video signals in which an input digital video signal corresponding to a displayed image and occurring in successive samples derived at a sampling clock frequency is divided to form N channel signals, N being an integer large than 2, said input digital video signal including successive groups of said samples corresponding to successive unit time intervals and each said group being divided into N sections of successive samples, the samples within each section corresponding to a defined area of the displayed image, said apparatus comprising:

addressable memory means receiving said successive samples for storing the same at selected write addresses and for reading out the stored samples from selected read addresses;

clocking signal generating means for generating a clock signal at said sampling frequency and N latch signals each having a latch frequency equal to 1/N times said sampling frequency, each successive latch signal being phase shifted relative to a next previous latch signal by a delay equal to one period of said sampling frequency;

address control means for generating said selected write addresses and said selected read addresses in response to said clock signal to cause cyclically sequential read out of said N sections such that said stored samples are read out in the order of entry starting from a foremost sample in each of said N sections; and N latch means responsive to respective ones of said N latch signals for latching the read out samples, said selected write addresses and said selected read addresses being generated such that the samples latched by each of said latch means are the samples within a respective one of said N sections and correspond to the respective defined area of the image, outputs of said latch means respectively constituting said N channel signals.

2. The apparatus according to claim 1, characterized in that said N channel signals are obtained by dividing a horizontal line period of said input video signal into said N equal sections, said horizontal line period being said unit time interval of said input video signal.

3. The apparatus according to claim 2, characterized in that said memory means includes at least two memory circuits into which said input video signal is alternately written and read out at intervals of one said horizontal line period.

4. The apparatus according to claim 1, characterized in that said samples are read out from said memory means at said selected read addresses under control of said address control means so that a final plurality of said samples of the first N−1 of the N sections overlaps with an initial plurality of a next successive section.

* * * * *